United States Patent
Hurup et al.

(10) Patent No.: US 12,180,925 B2
(45) Date of Patent: Dec. 31, 2024

(54) METHOD OF MANUFACTURING AN ADAPTABLE CARBON-FIBER BEAM

(71) Applicant: Siemens Gamesa Renewable Energy A/S, Brande (DK)

(72) Inventors: Allan Hurup, Nibe (DK); Mogens Nielsen, Aalborg (DK); Wei Sun, Gistrup (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 0 days.

(21) Appl. No.: 17/537,597

(22) Filed: Nov. 30, 2021

(65) Prior Publication Data

US 2022/0195983 A1    Jun. 23, 2022

(30) Foreign Application Priority Data

Dec. 22, 2020   (EP) .................................... 20216420

(51) Int. Cl.
| | |
|---|---|
| *B29C 70/68* | (2006.01) |
| *B29C 70/84* | (2006.01) |
| *F03D 1/06* | (2006.01) |
| B29K 307/04 | (2006.01) |
| B29K 309/08 | (2006.01) |
| B29L 31/08 | (2006.01) |

(52) U.S. Cl.
CPC .......... *F03D 1/0675* (2013.01); *B29C 70/682* (2013.01); *B29C 70/84* (2013.01); *B29K 2307/04* (2013.01); *B29K 2309/08* (2013.01); *B29K 2995/0053* (2013.01); *B29L 2031/085* (2013.01); *F05B 2230/21* (2013.01); *F05B 2280/2001* (2013.01); *F05B 2280/2006* (2013.01); *F05B 2280/6003* (2013.01)

(58) Field of Classification Search
CPC . B29C 37/0082; B29C 70/342; B29C 70/521; B29C 70/443; B29C 53/04
See application file for complete search history.

(56) References Cited

U.S. PATENT DOCUMENTS

| | | | |
|---|---|---|---|
| 10,077,758 B2 * | 9/2018 | Yarbrough | ............ F03D 1/0675 |
| 10,723,089 B2 * | 7/2020 | Nielsen | ................... F03D 80/30 |

(Continued)

FOREIGN PATENT DOCUMENTS

| | | |
|---|---|---|
| CN | 101137841 A | 3/2008 |
| CN | 102975374 A | 3/2013 |

(Continued)

*Primary Examiner* — Michael A Tolin
*Assistant Examiner* — Hana C Page
(74) *Attorney, Agent, or Firm* — Schmeiser, Olsen & Watts LLP (57) ABSTRACT

Provided is a method of manufacturing an adaptable pre-cast resin-infused carbon-fiber beam, which method includes the steps of arranging a plurality of elongate carbon-fiber blocks side by side; arranging sheets to enclose the blocks and to extend over opposing faces of adjacent blocks; arranging the sheets to converge as an outwardly projecting elongate bead at a junction between adjacent blocks; and pulling on the elongate bead to inhibit resin flow between blocks during a resin infusion step. Also provided is a pre-cast adaptable carbon-fiber beam manufactured using that method; a method of manufacturing a wind turbine rotor blade; and a wind turbine rotor blade.

6 Claims, 7 Drawing Sheets

(56) References Cited

U.S. PATENT DOCUMENTS

| | | | |
|---|---|---|---|
| 2011/0081514 A1 | 4/2011 | Day et al. | |
| 2017/0114773 A1* | 4/2017 | Riahi | B29C 70/44 |
| 2019/0001592 A1 | 1/2019 | Nielsen et al. | |
| 2019/0270261 A1 | 9/2019 | Randall | |
| 2020/0025168 A1* | 1/2020 | Wernlund | F03D 1/0675 |
| 2020/0318604 A1 | 10/2020 | Girolamo et al. | |
| 2021/0161338 A1 | 6/2021 | Hwang et al. | |

FOREIGN PATENT DOCUMENTS

| | | |
|---|---|---|
| CN | 106029347 A | 10/2016 |
| CN | 106255825 A | 12/2016 |
| CN | 106457696 A | 2/2017 |
| CN | 107718621 A | 2/2018 |
| CN | 110497628 A | 11/2019 |
| CN | 111794901 A | 10/2020 |
| DE | 2238479 A1 | 2/1974 |
| DE | 102013205779 A1 | 10/2014 |
| DE | 102017113769 A1 | 12/2018 |
| EP | 3719296 A1 | 10/2020 |
| TW | 202122023 A | 6/2021 |
| WO | WO 2018091054 A1 | 5/2018 |

\* cited by examiner

METHOD OF MANUFACTURING AN ADAPTABLE CARBON-FIBER BEAM

CROSS-REFERENCE TO RELATED APPLICATIONS

This application claims priority to European Application No. 20216420.8, having a filing date of Dec. 22, 2020, the entire contents of which are hereby incorporated by reference.

FIELD OF TECHNOLOGY

The following describes a method of manufacturing an adaptable carbon-fiber beam; a pre-cast adaptable carbon-fiber beam; a method of manufacturing a wind turbine rotor blade; and a wind turbine rotor blade.

BACKGROUND

During operation of a wind turbine, a rotor blade can experience large bending moments, particularly in the inboard region. The magnitude of the bending moment increases with rotor blade length, and long rotor blades must be constructed to have sufficient stiffness in order to avoid excessive deformation during normal operation of the wind turbine or during high wind loading conditions.

For these reasons, it has become usual for a wind turbine rotor blade design to include a large number of fiberglass reinforcements in the inboard region, especially in the trailing edge and leading-edge regions. It is known to incorporate sandwich structures with thick fiberglass layers and panel cores in the flatter rotor blade inboard regions. However, the manufacture of a rotor blade to include such reinforcements is time-consuming and expensive. Another drawback of these reinforcements is the unfavorable increase in weight of the rotor blade.

An alternative approach is to use carbon material instead of fiberglass to reinforce the critical rotor blade regions. However, while glass-fiber reinforcing material is available in a wide range of flexible mats and rovings which can easily be arranged to follow the shape of a rotor blade mold, pultruded or pre-cast carbon-fiber elements with equivalent stiffness characteristics are generally only available as flat beams or board-shaped elements. This limitation is a problem on account of the highly curved surfaces in the rotor blade inboard region, particularly at the rounded leading edge and the acute trailing edge. It is also difficult to arrange a flat pre-cast carbon-fiber element in the less curved rotor blade regions with a desired degree of precision.

The rotor blade mass moment accumulates towards the inboard region, and the practically achievable rotor blade length will therefore depend on the stiffness that can be achieved in the inboard region. However, the difficulties associated with stiffening the inboard rotor blade region means that the rotor blade length is generally less than what could be achieved. The restricted rotor blade length, in turn, places a restriction on the output power that could be generated.

SUMMARY

An aspect relates to a way of increasing the stiffness in an inboard region of a rotor blade to overcome the problems outlined above.

This aspect is achieved by the method of manufacturing an adaptable carbon-fiber beam; by the pre-cast adaptable carbon-fiber beam; by the method of manufacturing a wind turbine rotor blade; and by the wind turbine rotor blade.

According to embodiments of the invention, the method of manufacturing an adaptable or "shape-adjustable" pre-cast resin-infused carbon-fiber beam comprises the steps of arranging a plurality of elongate carbon-fiber blocks side by side so that adjacent blocks face each other across a gap, and then arranging fiber sheets to enclose the blocks and to extend over opposing faces of adjacent blocks. In other words, at this stage long surfaces of the block assemblies are covered by the sheet material. In a next step, the sheet material is gathered to converge as an outwardly projecting elongate bead or "piping" at a junction between adjacent blocks. A bead is effectively formed by pushing a sheet down between the opposing side faces of two adjacent blocks and beyond their lower surfaces, also pushing the lower sheet material downwards, and the layers of sheet material that now extend outward are collectively referred to as the "bead". For example, a bead formed by gathering one lower sheet layer and one upper sheet layer would comprise four layers. In a subsequent step, the assembly undergoes a resin infusion step. During this resin infusion step, the sheet layers forming the bead are pressed together over the entire length of the bead. This effectively inhibits resin flow from one block to another during the resin infusion step, i.e., the bead acts as a resin barrier between adjacent blocks, inhibiting the flow of resin into the bead. As a result, the opposing faces of the blocks on either side of that bead will therefore be prevented from "sticking together"; the bead forms a "hinge" between adjacent carbon blocks; and the material of the bead remains "dry", i.e., free of resin, and will therefore bond advantageously well with composite material during molding of a wind turbine rotor blade.

The adaptable carbon-fiber beam can have any length, for example a length in the order of 20 m or more. The width of the adaptable carbon-fiber beam will depend, among other factors, on the number of carbon-fiber blocks and on the widths of those blocks.

An elongate carbon-fiber block may be assumed to be pultruded in an epoxy matrix. The epoxy matrix will liquefy when heated during an infusion step and will suffuse throughout the block. The liquid resin will pass between layers of each block.

After curing, an elongate bead of the adaptable carbon-fiber beam acts as a type of "hinge", since the blocks on either side of this hinge have not been bonded to each other during the resin infusion step and can therefore be pivoted—at least to some extent—about the bead. An advantage of the inventive carbon-fiber beam is that this hinged structure allows the shape of the carbon beam to adapt to the shape of the structure in which it will later be embedded. The number of blocks (governing the beam width), their cross-sectional shape and the length of the blocks (governing the beam length) can be chosen on the basis of a specific implementation, for example to arrange the beam at the curved leading edge of a wind turbine rotor blade, or at the tapering trailing edge.

According to embodiments of the invention, the method of manufacturing a wind turbine rotor blade comprises the steps of providing a rotor blade mold to receive a composite layup; providing such a pre-cast adaptable carbon-fiber beam; arranging the pre-cast carbon-fiber beam in the composite layup and adjusting the shape of the pre-cast carbon-fiber beam according to the shape of the rotor blade mold, and subsequently performing resin infusion and curing to bond the pre-cast carbon-fiber beam in the composite shell of the rotor blade.

The manufacture of such a rotor blade is favorably economical because it is straightforward to arrange the adaptable carbon-fiber beam in the composite layup during the molding procedure. The shape of the adaptable carbon-fiber beam can be adjusted to follow a curvature of the rotor blade shape, while at the same time being favorably easy to position in the composite layup. Furthermore, the pre-cast adaptable carbon-fiber beam itself can be cheaper that more complex reinforcing structures as explained above.

As explained above, the number of blocks and the number of elongate beads or hinges can be chosen according to the intended implementation. For example, for implementation at the curved leading edge, an adaptable carbon-fiber beam can be manufactured to have such a "hinge" between every pair of adjacent blocks, and the blocks themselves may be relatively narrow. For implementation at the flatter and tapering trailing edge, the blocks of an adaptable carbon-fiber beam may be wider, and a single "hinge" may suffice.

According to embodiments of the invention, such a rotor blade comprises a number of the inventive pre-cast adaptable carbon-fiber beams in a transition region of the rotor blade. The transition region shall be understood as the region extending between the generally circular root and the airfoil region. Depending on the rotor blade geometry, the transition region of a 90 m rotor blade can, for example, extend from 5% to 30% of the rotor blade length.

An advantage of the inventive rotor blade is that its structural strength in the critical transition region can be greatly increased without adding significantly to the cost of manufacture. Because the inventive rotor blade is better able to withstand bending loads, the length of the rotor blade may be increased, allowing higher power output from a wind turbine equipped with such rotor blades.

Embodiments and features of the invention are given by the dependent claims, as revealed in the following description. Features of different claim categories may be combined as appropriate to give further embodiments not described herein.

In the following, it may be assumed that a rotor blade is manufactured by arranging glass-fiber layers (mats, rovings, etc.) and structural reinforcing parts in a mold, before closing the mold and performing a resin infusion procedure.

In the following, for simplicity, an "elongate carbon-fiber block" may simply be referred to as a "block", and this term shall be understood to mean the stack of layers that forms an elongate carbon-fiber block in the inventive pre-cast adaptable beam.

The inventive adaptable carbon-fiber beam can be incorporated in any part of the rotor blade that benefits from structural reinforcement. In an embodiment of the invention, the rotor blade incorporates one or more such pre-cast adaptable carbon-fiber beams at its leading edge, such as inboard in the transition region. Alternatively, or in addition, a rotor blade incorporates one or more such pre-cast adaptable carbon-fiber beam at its trailing edge, inboard in the transition region.

As explained above, the geometry of the adaptable carbon-fiber beam can be tailored to its intended implementation. A general manufacturing method is explained in the following. In a first preparatory step, a base sheet (comprising at least one sheet of unidirectional carbon-fiber material) is spread onto an assembly surface. The carbon-fiber blocks are then assembled on this base sheet arrangement by stacking layers of pultruded carbon-fiber strips, each having an essentially rectangular form. The lengths of the pultruded elements may all be the same. Each block comprises a stack of at least two pultruded carbon strips, more desirable three or more. Of course, the number of pultruded carbon strips to use will depend on their thicknesses and the desired beam thickness. In an embodiment of the invention, a biaxial carbon fiber sheet is arranged over each stack layer, i.e., a biaxial carbon-fiber sheet is laid to cover all pultruded carbon strips of the same layer. If each block has three layers, two biaxial carbon fiber sheets will be used. The final layer of pultruded carbon strips is then covered by a top sheet (at least one sheet of unidirectional carbon-fiber material). This assembly can in turn be enclosed by a sheet of glass-fiber material.

For ease of incorporation into a composite layup, the adaptable carbon-fiber beam is constructed to comprise a wedge-shaped element arranged along the outside face of each outer block. A tapered or wedge-shaped element can also be provided as a pultruded carbon-fiber element.

The advantage of the inventive pre-cast adaptable carbon-fiber beam is that (after curing or hardening) its shape can be altered by pivoting the blocks on either side of an elongate bead. If the carbon-fiber blocks have rectangular cross-sections, the blocks on either side of a bead can be tilted away from each other. However, if the carbon-fiber blocks have a trapezoidal cross-section and are wider at the base, the blocks on either side of a bead can then also be turned towards each other, allowing for more flexibility of the pre-cast adaptable carbon-fiber beam. Therefore, in an embodiment of the invention, the carbon-fiber blocks are assembled from stack layers shaped so that opposing faces of adjacent blocks subtend an angle in the range of 5° to 20°. For example, a pultruded element can have one vertical side face and one inclined side face, or two inclined side faces. One or both opposing faces of a pair of adjacent blocks can have an inclined side face. In such a realization, the collective area of the lower face of the adaptable carbon-fiber beam exceeds the area of its upper face. The achievable radius of curvature of the adaptable carbon-fiber beam will then depend on the geometry of the trapezoidal blocks and also on the number of elongate bead "hinges".

An elongate bead can be formed by pushing all sheets downwards through the gap between adjacent blocks, so that all sheets converge as a "bundle" at the underside of the assembly. Any suitable tool can be used for this purpose. When this bundle of layers is pulled downwards, away from the underside of the assembly, the effect is to press the sheets against the opposing block faces.

In an embodiment of the invention, an inflatable hose is arranged in the center of the "bundle" of layers emerging at the underside of the assembly. The hose itself may be used to pushing all sheets downwards through the gap between adjacent blocks. During the resin infusion step, the hose is inflated, and the effect of this is to pull the sheet layers downwards, achieving the desired result of pressing sheet layers against the surfaces of the opposing block faces.

In an embodiment of the invention, the assembly is prepared on a suitable molding table, which has been prepared to comprise several elongate sections with recesses or groves along opposing faces to receive a sheet bundle and inflatable hose. After assembling the blocks on the base sheet and covering the blocks with the top sheet, a hose is arranged over the gap between adjacent blocks and pushed downwards into the gap between elongate sections of the molding table. The molding table can be constructed to comprise multiple sections in order to receive such inflatable hoses. In preparation for a resin infusion step, the hoses are inflated to pull the sheet layers firmly downwards, pressing the sheet layers against the block side faces. The hoses are kept inflated until the resin has cured. As long as the sheet layers are pressed against the block side faces, the taut sheets act as a resin barrier, preventing liquid resin from moving into the bead or spreading to an adjacent block. After deflating the hoses, these can be removed, and the pre-cast adaptable carbon-fiber beam is lifted off the molding table. The skilled person will be familiar with the usual measures of applying a release coat to the molding table and to any other relevant element.

Carbon-fiber is an electrically conductive material. For this reason, any carbon-fiber reinforcing element must be either reliably isolated from any other conductive element in the interior of the rotor blade, or directly connected to the lightning protection system of the rotor blade. Therefore, in an embodiment of the invention, the adaptable carbon-fiber beam is assembled to include a connecting it to the LPS of a rotor blade. In an embodiment of the invention, the adaptable carbon-fiber beam is assembled so that the base sheet and top sheet are part of a single sheet of unidirectional carbon-fiber, and part of this unidirectional carbon-fiber sheet extends outward from the pre-cast adaptable carbon-fiber beam so that it can be connected to an LPS. The single unidirectional carbon-fiber sheet extends about the entire structure of the pre-cast adaptable carbon-fiber beam ensures that any potential is evenly distributed about the adaptable carbon-fiber beam, so that the risk of flash-over is minimized.

As explained above, the blocks and carbon-fiber sheets of the assembly can be enclosed by a sheet of glass-fiber material. This can be a sheet of woven or matted glass-fiber which will bond to the composite layup in the intended application. A glass-fiber sheet is "dry", i.e., not impregnated with resin.

The manufacture of the inventive adaptable carbon-fiber beam uses the same materials and resin-infusion tools as the manufacture of a conventional art non-adaptable carbon-fiber beam. The only adjustments are that the blocks can be assembled to have inclined side faces if the adaptable carbon-fiber beam is to be bent inwards to achieve a concave shape; and that the sheet material is gathered in elongate beads to form the hinges after resin-infusion. Additional sheet material is therefore needed, but the material in the bead is not infused with resin during the pre-casting step "dry" and therefore remains flexible, so that the elongate bead can advantageously bond with the composite material of the rotor blade layup during resin infusion of the rotor blade.

Other advantages and features of embodiments of the present invention will become apparent from the following detailed descriptions considered in conjunction with the accompanying drawings. It is to be understood, however, that the drawings are designed solely for the purposes of illustration and not as a definition of the limits of embodiments of the invention.

BRIEF DESCRIPTION

Some of the embodiments will be described in detail, with reference to the following figures, wherein like designations denote like members, wherein.

DETAILED DESCRIPTION

Figure 1:
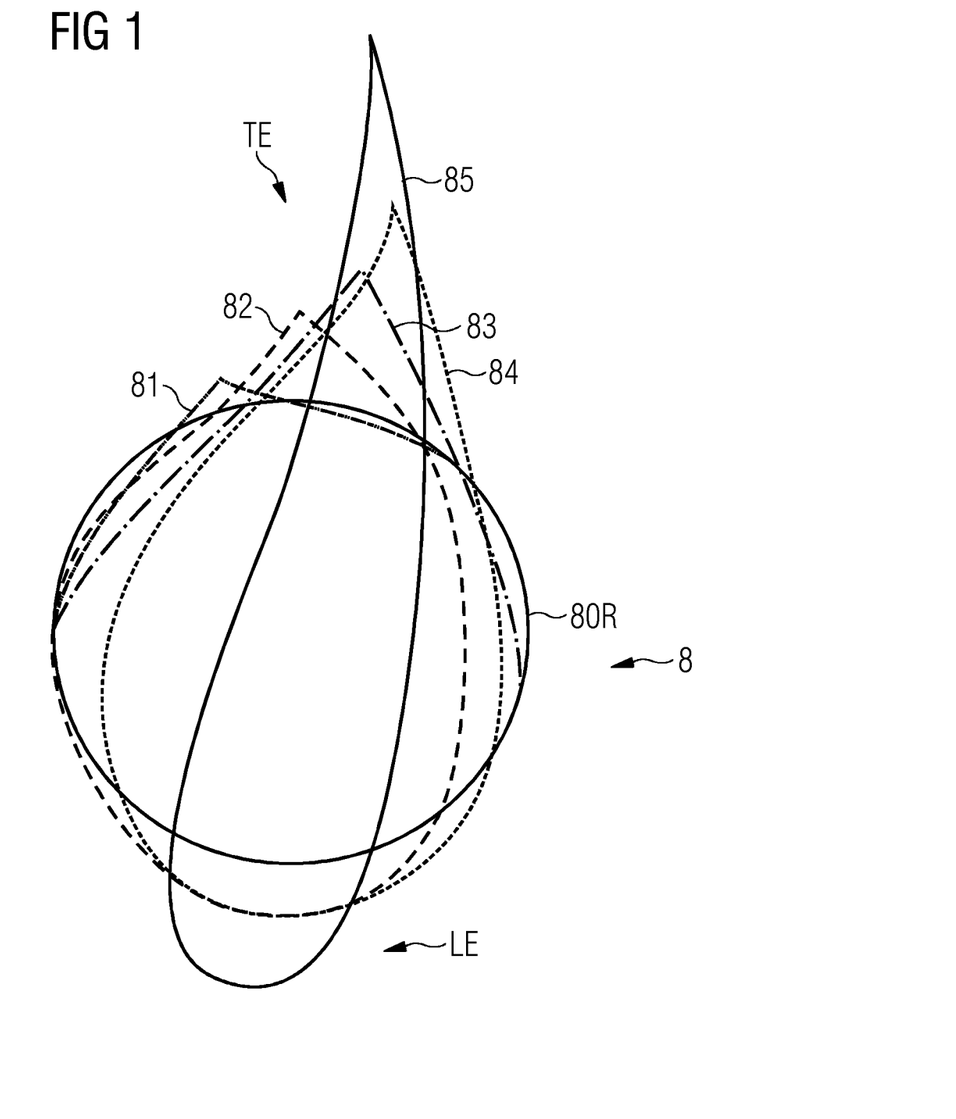
FIG. 1 shows a series of cross-sections through a wind turbine rotor blade.
Figure 2:
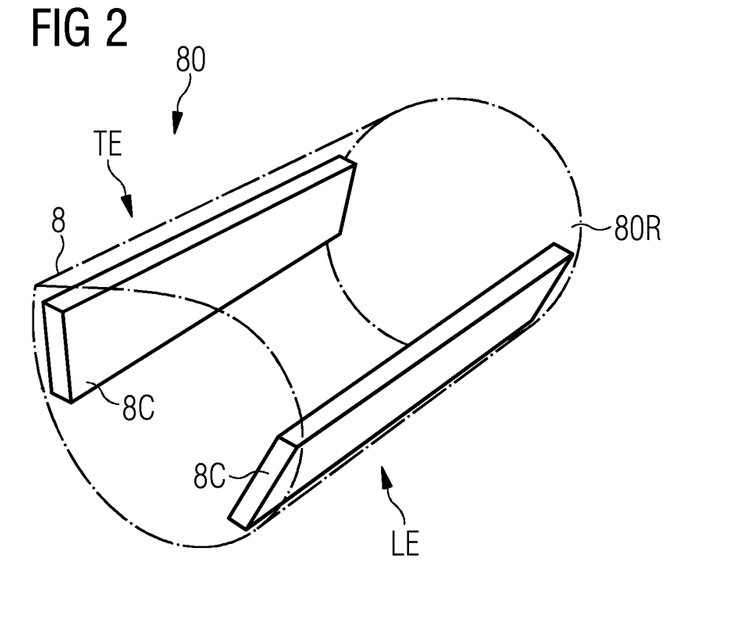
FIG. 2 illustrates a reinforced transition region in a conventional art wind turbine rotor blade.

FIG. 1 shows a series of cross-sections through a wind turbine rotor blade 8, commencing with a cross-section 81 through the circular root region 80R and progressing to a cross-section 85 through an airfoil region. The shape of the rotor blade transitions in a complex manner from the initially circular shape, as indicated by cross-sections 81-84. This inboard part of the rotor blade is referred to as the "transition region" or "shoulder region" and must be dimensioned to withstand high bending moments during normal operation of the wind turbine and also during severe wind conditions. The usual approach is to make the rotor blade shell very thick in the transition region, but the added composite material increases the weight of the rotor blade. Alternatively, it is known to embed reinforcing structures of a lightweight but rigid material such as wood, but these structures are time-consuming and expensive to manufacture. In another approach, as shown the wireframe representation in FIG. 2, lightweight carbon-fiber beams 8C can be embedded in the transition region 80 of a rotor blade 8. However, pre-cast carbon-fiber beams 8C made of economical pultruded parts are rectangular in shape and therefore do not conform to the curved leading edge LE or the tapered trailing edge TE. Furthermore, the flat shape of such carbon-fiber beams 8C makes it difficult to place them in the composite layers during build-up of the rotor blade shell in the molding process.

Figure 3:
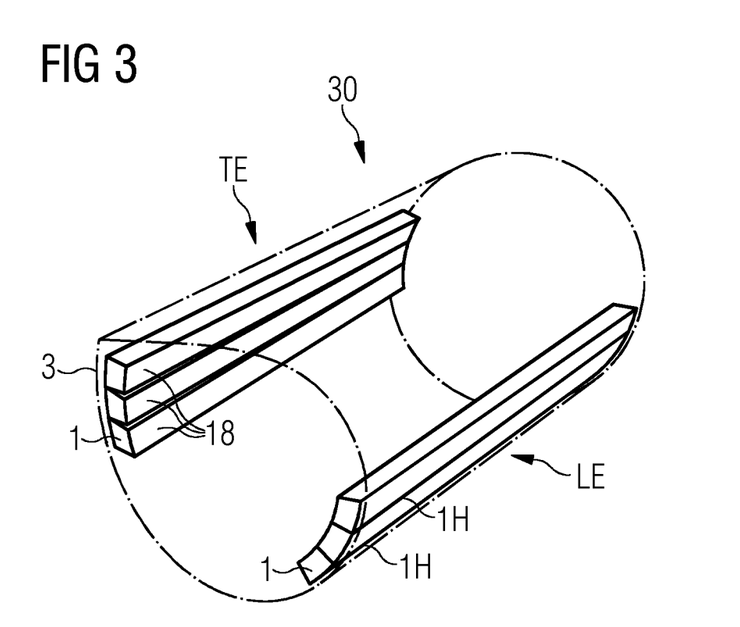
FIG. 3 illustrates a reinforced transition region in an embodiment of the inventive wind turbine rotor blade.

FIG. 3 is a wireframe representation that illustrates a reinforced transition region 30 in an embodiment of the inventive wind turbine rotor blade 3. Here, lightweight shape-adaptable pre-cast carbon-fiber beams 1 are embedded in the transition region 30 of the rotor blade 3. Each pre-cast adaptable carbon-fiber beam 1 comprises several elongate blocks 1B connected by elongate "hinges" 1H so that the shape of the beam 1 can be adjusted to conform to the shape of the rotor blade shell during the shell molding procedure.

Figure 4:
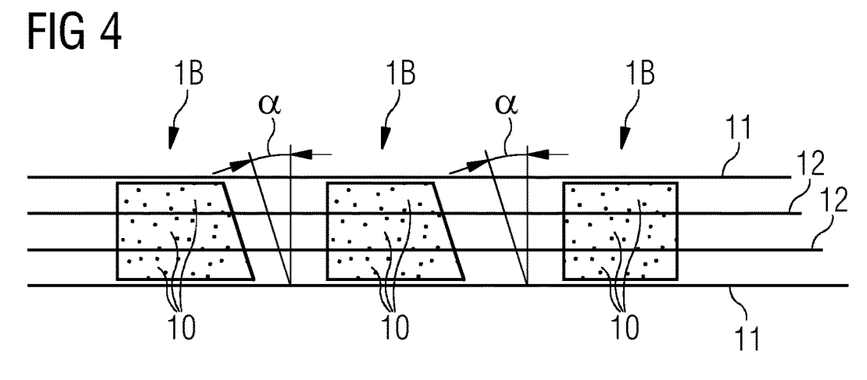
FIG. 4 illustrates a stage in the manufacture of the inventive adaptable carbon-fiber beam.
Figure 5:
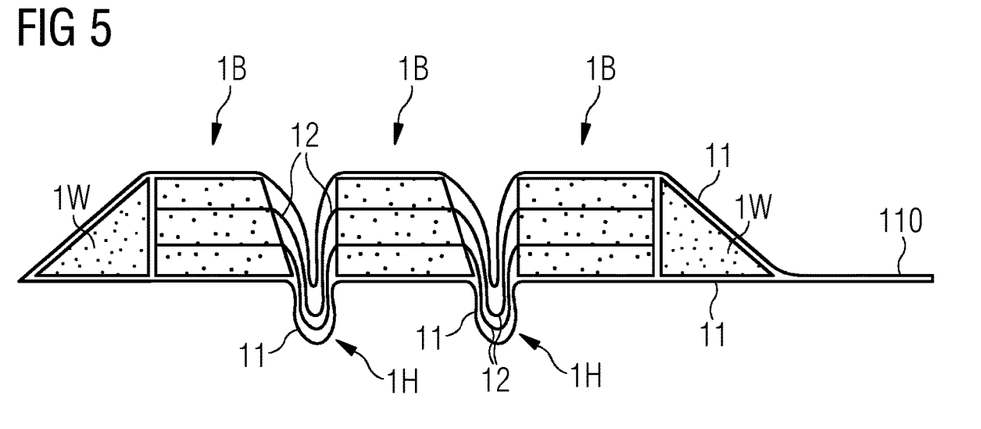
FIG. 5 illustrates a subsequent stage in the manufacture of the inventive adaptable carbon-fiber beam.
Figure 6:
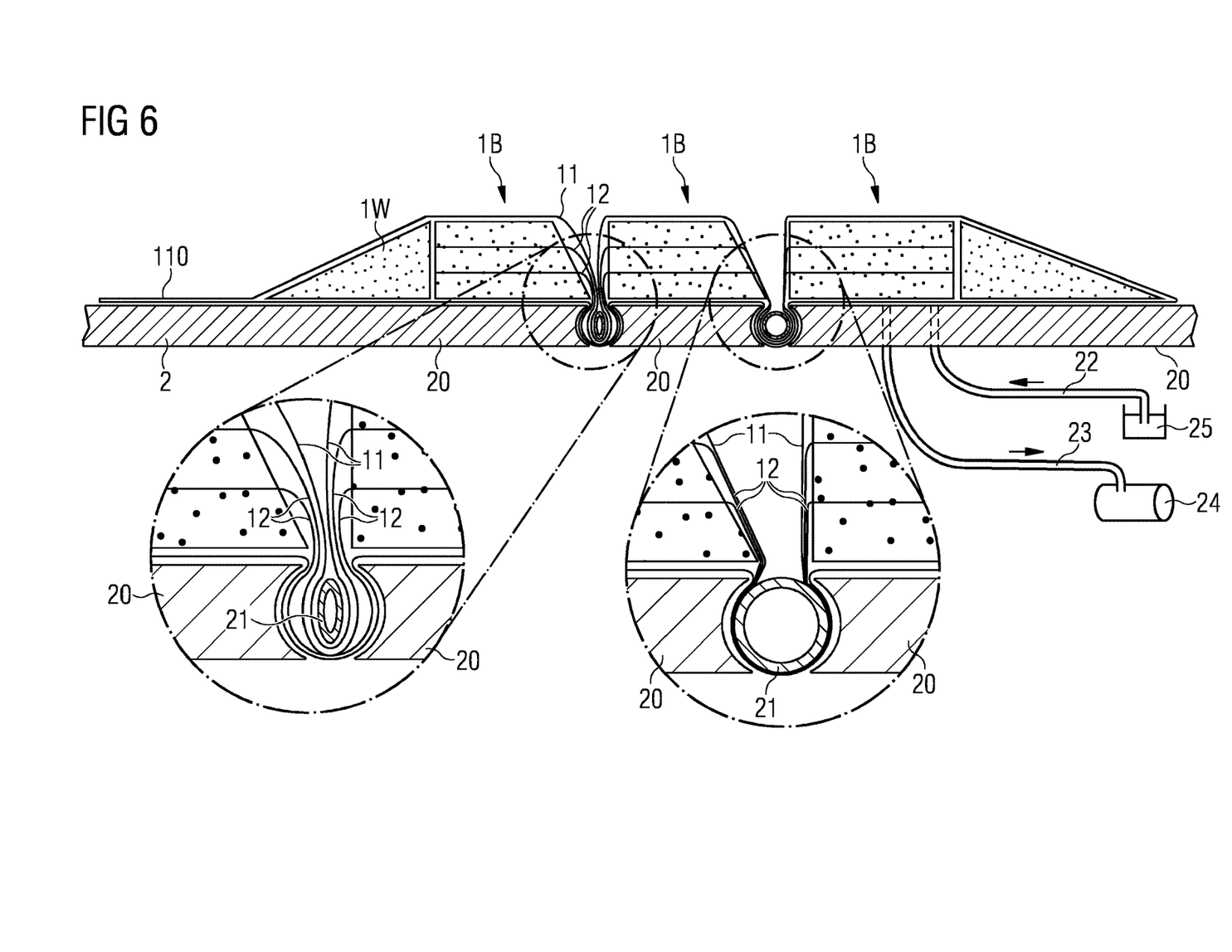
FIG. 6 shows one approach to forming the "hinges" at the junctions between adjacent blocks.

FIGS. 4-6 illustrate stages in the manufacture of such a pre-cast adaptable carbon-fiber beam 1. In FIG. 4, a unidirectional carbon-fiber sheet 11 is laid on a surface. Blocks 1B of pultruded carbon-fiber elements 10 are assembled, whereby sheets 12 of biaxial carbon-fiber material are arranged between stack layers. Each pultruded carbon-fiber element 10 can have a cross-section with dimensions in the order of 50 mm×50 mm, and a length in the order of 20 m. The elements 10 are selected to form blocks with straight side faces or inclined side faces, as shown here. The smallest radius of curvature of the completed adaptable carbon-fiber beam 1 will be determined by the angles α subtended between the blocks 1B.

FIG. 5 shows a subsequent stage. Here, all sheet layers 11, 12 have been pushed downwards in the gaps between adjacent blocks 1B to form a bead or hinge 1H at the underside of the assembly. The diagram also shows two lateral tapering elements 1W which will later help the adaptable carbon-fiber beam to be incorporated in the composite layup of a rotor blade. The unidirectional carbon-fiber sheet 11 extends outward to one side, to serve as a connecting surface 110 for electrical connection to a rotor blade LPS.

FIG. 6 shows one approach to forming the "hinges" 1H at the junctions between adjacent blocks 1B. Here, the molding surface is a table 2 with sections shaped to form channels 200 that will receive a bundle of sheet material as well as an inflatable hose 20. In this diagram, the carbon beam assembly is shown to also include a glass-fiber sheet 13 enclosing the other components. The entire assembly can be arranged inside a vacuum bag in preparation for a VARTM procedure, as will be known to the skilled person. The molding surface 2 is also provided with a resin inlet/outlet pair (indicated only schematically) under each elongate block 1B. During VARTM, a vacuum pump 24 is used to draw in resin from a reservoir 25 through the resin inlets 22 and to draw out excess resin through the resin outlets 23.

Figure 7:
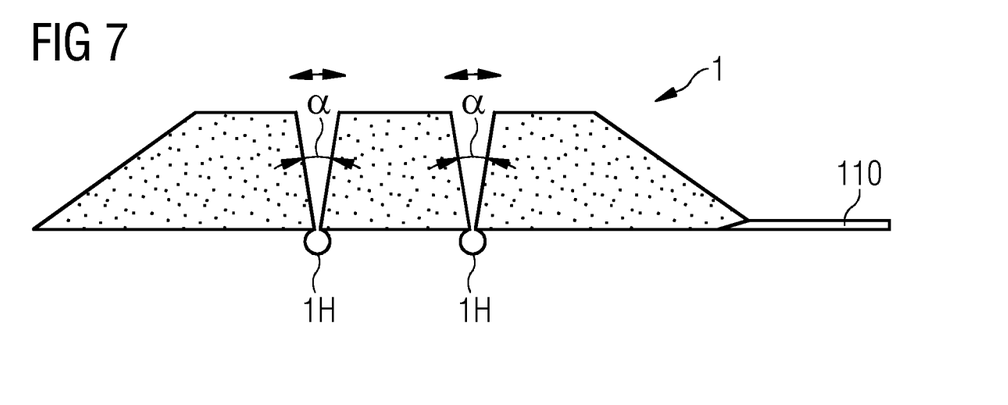
FIG. 7 illustrates shape adaptation of an embodiment of the inventive adaptable carbon-fiber beam.
Figure 8:
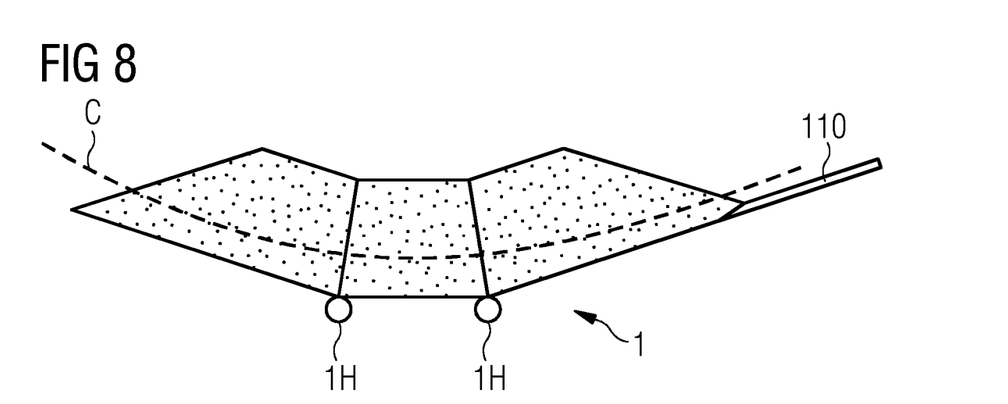
FIG. 8 illustrates shape adaptation of an embodiment of the inventive adaptable carbon-fiber beam.
Figure 9:
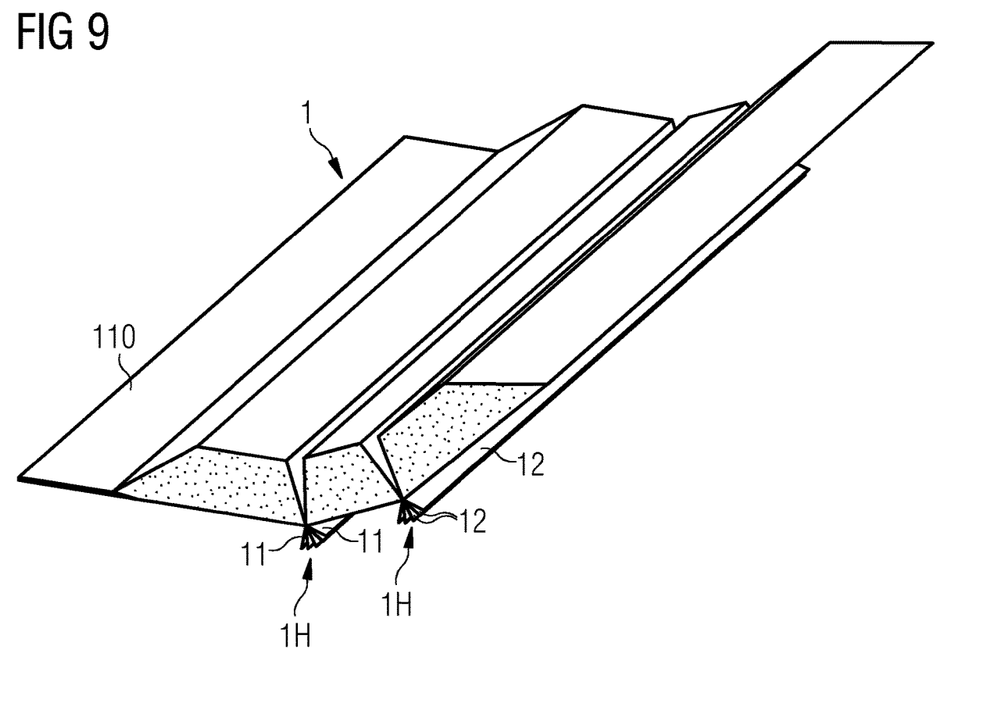
FIG. 9 illustrates shape adaptation of an embodiment of the inventive adaptable carbon-fiber beam.

On the left, the diagram shows an enlarged view of a channel 200 between table sections 20, showing the inflatable hose in the center of the sheet material bundle 11, 12, 13, prior to inflation. When the hose is inflated, as shown on the right, the sheet layers 11, 12, 13 are pulled taut and pressed together. As a result, during resin infusion, the bead 1H acts as a barrier to the resin, which is inhibited from entering the bead 1H. As a result, the bead 1H remains "dry" and, after curing, the blocks are freely pivotable about the "hinge" formed by the dry sheet material of the bead 1H along the underside of the cured beam. Even so, the layers 10 of each block stack are firmly fused together by the cured resin, and firmly fused to their enclosing sheet layers 11, 12. The pre-cast adaptable carbon-fiber beam 1 is therefore inherently rigid while being shape-adjustable. This is indicated in FIGS. 7-9, which illustrate shape adaptation of the inventive pre-cast adaptable carbon-fiber beam 1. The block structure on either side of a hinge 1H can pivot to some extent, as determined by the angle α subtended between adjacent blocks. FIG. 8 shows the smallest radius of curvature when all blocks are pivoted inwards to the greatest extent, allowing the pre-cast adaptable carbon-fiber beam 1 to assume an arcuate shape as indicated by the curved line C. FIG. 9 shows a perspective view of an embodiment of the inventive pre-cast adaptable carbon-fiber beam 1, showing the hinges 1H at the "underside" of the adaptable carbon-fiber beam 1 and blocks which have not (yet) been pivoted to their greatest extent. This curved pre-cast adaptable carbon-fiber beam 1 can be arranged in a leading-edge transition region of a rotor blade mound during the layup procedure, so that the cured rotor blade will exhibit given greater structural rigidity without increasing its mass. The reduced rotor blade mass and reduced mass moment can facilitate a favorably longer rotor blade length and a corresponding increase in energy production.

The adaptable carbon-fiber beam 1 is connected to a rotor blade LPS by the outwardly extending band 110 of the unidirectional carbon-fiber sheets 11. With this arrangement, it is possible to minimize the risk of flash-over during a lightning strike.

Figure 10:
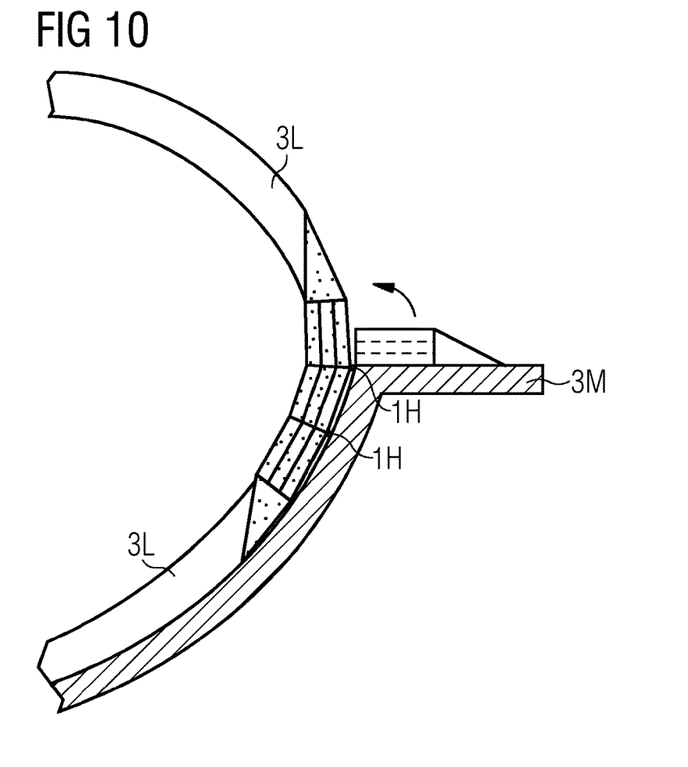
FIG. 10 illustrates a step in the manufacture of a wind turbine rotor blade.

FIG. 10 illustrates a step in the manufacture of a wind turbine rotor blade. The diagram shows a lower mound half 3M, at a cross-section through the transition region. The diagram shows an embodiment of the inventive pre-cast carbon-fiber beam 1 on the left, near the trailing edge region. The pre-cast carbon-fiber beam 1 can adapt to the slight curvature in this region and can easily be embedded in the composite layup 3L of the lower rotor blade half. The diagram also shows another embodiment of the inventive pre-cast carbon-fiber beam 1 on the right, near the leading-edge region. The pre-cast carbon-fiber beam 1 can also easily adapt its shape to be embedded in the composite layup 3L in the rounded shape of the mound in this region. This leading-edge pre-cast carbon-fiber beam 1 is shown with a hinge positioned along the junction between the lower mound half 3M and an upper mound half (indicated by the dashed line) The upper portion of the pre-cast carbon-fiber beam 1 can be pivoted upward when the lower layup is complete.

Figure 11:
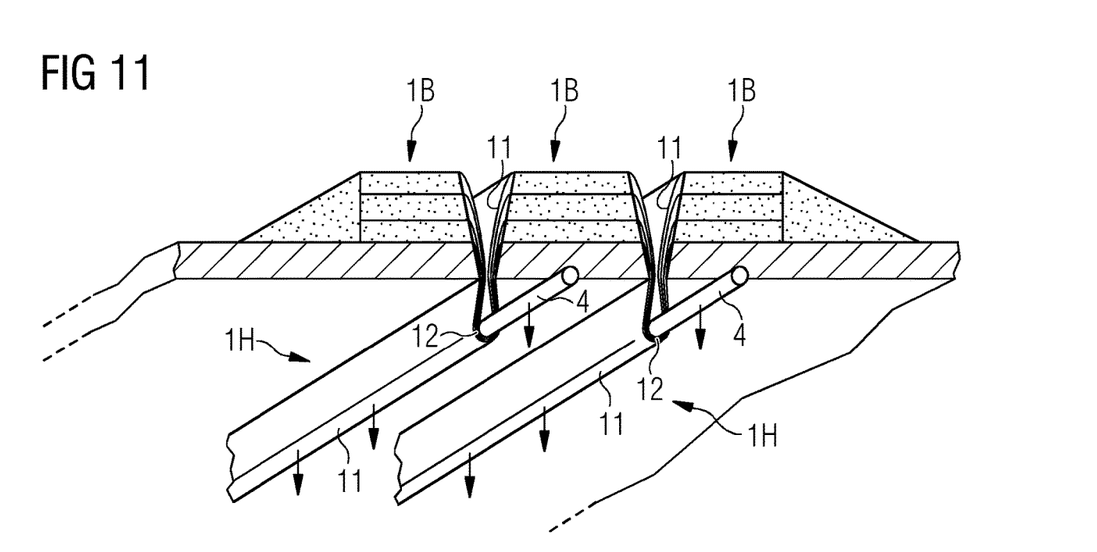
FIG. 11 illustrates an alternative mode of manufacturing the inventive adaptable carbon-fiber beam.

FIG. 11 shows an alternative manner of forming the pre-cast carbon beam 1. The assembly is prepared as described above in FIG. 4 and FIG. 5 and comprises stacks of pultruded carbon elements and glass-fiber sheets 11, 12. Here, a thin rod 4 is used to bring the excess sheet material below the level of the molding surface 2 and, during the resin infusion step, tension is maintained as indicated by the arrows so that the sheet layers are pressed together to inhibit resin flow from the blocks 1B into the beads 1H. Instead of using a rod 4 as shown here, the bead 1H can be formed by clamping the sheet layers firmly together along their entire length. The only requirement at this stage is that the sheet layers 11, 12 are pressed against each other in such a way as to prevent liquid resin from passing from a block 1B into the bead 1H.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of manufacturing an adaptable pre-cast resin-infused carbon-fiber beam, which method comprises:
    arranging a plurality of elongate carbon-fiber blocks side by side;
    arranging sheets to enclose the blocks and to extend over opposing faces of adjacent blocks;
    arranging the sheets to converge as an outwardly projecting elongate bead at a junction between adjacent blocks;
    pulling on the elongate bead; and
    performing a resin infusion step;
    wherein the pulling on the elongate bead inhibits resin flow between blocks during the resin infusion step.

2. The method according to claim 1, comprising a preparatory step of assembling the carbon-fiber blocks by stacking layers of elongate carbon-fiber strips.

3. The method according to claim 2, comprising a step of arranging biaxial carbon fiber sheets between successive stack layers.

4. The method according to claim 1, comprising a step of inserting an inflatable hose in the interior of the bead, and wherein the step of pulling on the elongate bead is achieved by inflating the hose.

5. The method according to claim 1, comprising a step of providing a mold with a cavity for a bead, which cavity is shaped to receive the sheets and an inflatable hose.

6. A method of manufacturing a wind turbine rotor blade, which method comprises:
- providing a rotor blade mold to receive a composite layup;
- providing a pre-cast adaptable carbon-fiber beam having a plurality of resin-infused blocks, wherein at least one pair of adjacent blocks are joined by an elongate bead formed by sheets and are pivotable about the elongate bead;
- incorporating the pre-cast carbon-fiber beam in the composite layup; and
- adjusting the shape of the pre-cast carbon-fiber beam according to the shape of the rotor blade mold.

\* \* \* \* \*